(12) United States Patent
Chen et al.

(10) Patent No.: US 11,881,135 B2
(45) Date of Patent: Jan. 23, 2024

(54) METHOD AND APPARATUS FOR DETERMINING SCREEN LIGHT INTENSITY VALUE, AND STORAGE MEDIUM

(71) Applicant: BEIJING XIAOMI MOBILE SOFTWARE CO., LTD., Beijing (CN)

(72) Inventors: Chaoxi Chen, Beijing (CN); Changyu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/349,868

(22) Filed: Jun. 16, 2021

(65) Prior Publication Data
US 2022/0301475 A1   Sep. 22, 2022

(30) Foreign Application Priority Data

Mar. 18, 2021   (CN) .......................... 202110291726.5

(51) Int. Cl.
G09G 3/20   (2006.01)
G01J 1/44   (2006.01)

(52) U.S. Cl.
CPC .......... *G09G 3/20* (2013.01); *G01J 2001/444* (2013.01); *G09G 2320/0626* (2013.01); *G09G 2360/144* (2013.01)

(58) Field of Classification Search
CPC ............. G09G 3/20; G09G 2320/0626; G09G 2360/14–148; G01J 2001/444
See application file for complete search history.

(56) References Cited

U.S. PATENT DOCUMENTS

| | | | |
|---|---|---|---|
| 2011/0285763 A1* | 11/2011 | Bassi | G09G 3/2003 345/694 |
| 2013/0181612 A1* | 7/2013 | Ohno | H05B 47/10 315/297 |
| 2014/0267202 A1* | 9/2014 | Zheng | G09G 5/10 345/207 |
| 2014/0312778 A1 | 10/2014 | Matsui | |

FOREIGN PATENT DOCUMENTS

| | | |
|---|---|---|
| EP | 3605512 A1 | 2/2020 |
| JP | 2005331644 A | 12/2005 |

OTHER PUBLICATIONS

Extended European Search Report in Application No. 21182543.5, dated Jan. 7, 2022.

* cited by examiner

*Primary Examiner* — Gene W Lee
(74) *Attorney, Agent, or Firm* — Syncoda LLC; Feng Ma

(57) ABSTRACT

A method can be applied to a terminal provided with a light sensor to determine a screen light intensity value. The method can include: obtaining a screen light intensity detection value detected by the light sensor, and obtaining a current environment temperature when the light sensor detects the screen light intensity detection value; determining a light intensity calibration coefficient corresponding to a value of the current environment temperature based on a corresponding relationship between a temperature and the light intensity calibration coefficient; and determining the screen light intensity value of the terminal based on the determined light intensity calibration coefficient and the screen light intensity detection value.

17 Claims, 6 Drawing Sheets

METHOD AND APPARATUS FOR DETERMINING SCREEN LIGHT INTENSITY VALUE, AND STORAGE MEDIUM

CROSS-REFERENCE TO RELATED APPLICATION

This application claims priority to Chinese Patent Application No. 202110291726.5 filed on Mar. 18, 2021, the disclosure of which is hereby incorporated by reference in its entirety.

BACKGROUND

With the rapid development of sciences and technologies, terminal technologies have made considerable progress. Terminal products can have varied forms, rich functions, and many different configurations. Generally, terminal products are provided with display screens to realize interaction with users in use, and people's requirements for the use of display screens are also increasing.

SUMMARY

The present disclosure generally relates to the field of terminal technologies, and more specifically, to a method and apparatus for determining a screen light intensity value, and a storage medium.

According to an aspect of the embodiments of the present disclosure, there is provided a method for determining a screen light intensity value, applied to a terminal provided with a light sensor, the method including: obtaining a screen light intensity detection value detected by the light sensor, and obtaining a current environment temperature when the light sensor detects the screen light intensity detection value; determining a light intensity calibration coefficient corresponding to a value of the current environment temperature based on a corresponding relationship between a temperature and the light intensity calibration coefficient; and determining the screen light intensity value of the terminal based on the determined light intensity calibration coefficient and the screen light intensity detection value.

In some embodiments, the light sensor includes a plurality of sensing channels, and for each sensing channel of the plurality of sensing channels, the corresponding relationship between the temperature and the light intensity calibration coefficient is determined in the following manner determining a first screen light intensity detection value, the first screen light intensity detection value including a screen light intensity detection value collected by the light sensor at a reference environment temperature; adjusting an environment temperature of the light sensor is located with a predetermined temperature adjustment step based on the reference environment temperature, and synchronously obtaining a second screen light intensity detection value collected by the light sensor at the adjusted temperature; when an absolute value of a difference between the second screen light intensity detection value and the first screen light intensity detection value is greater than an error threshold, determining a first temperature corresponding to the second screen light intensity detection value; and determining a ratio between the first screen light intensity detection value and the second screen light intensity detection value as a light intensity calibration coefficient corresponding to the first temperature.

In some embodiments, the corresponding relationship between the temperature and the light intensity calibration coefficient is determined in the following manner determining a temperature range in which the terminal uses the light sensor; determining a first number of first temperature ranges based on a predetermined temperature adjustment step and a difference between the highest temperature and the lowest temperature of the temperature range; and for the first number of first temperature ranges, determining a light intensity calibration coefficient corresponding to each first temperature range respectively.

In some embodiments, the determining a first number of first temperature ranges based on a predetermined temperature adjustment step and a difference between the highest temperature and the lowest temperature of the temperature range includes: determining a ratio between the difference between the highest temperature and the lowest temperature of the temperature range and the predetermined temperature adjustment step as the first number.

In some embodiments, the corresponding relationship between the temperature and the light intensity calibration coefficient is determined in the following manner determining a first screen light intensity detection value, the first screen light intensity detection value including a screen light intensity detection value collected by the light sensor at a reference environment temperature; adjusting an environment temperature of the light sensor is located with a predetermined temperature adjustment step based on the reference environment temperature, and synchronously obtaining a plurality of second screen light intensity detection values collected by the light sensor at the adjusted temperature; and determining a ratio between the first screen light intensity detection value and an average value of the plurality of second screen light intensity detection values as a light intensity calibration coefficient corresponding to the adjusted temperature.

In some embodiments, the determining the screen light intensity value of the terminal based on the determined light intensity calibration coefficient and the screen light intensity detection value includes: adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

According to another aspect of the embodiments of the present disclosure, there is provided an apparatus for determining a screen light intensity value, applied to a terminal provided with a light sensor, the apparatus including: an obtaining module, configured to obtain a screen light intensity detection value detected by the light sensor, and to obtain a current temperature of an environment where the light sensor detects the screen light intensity detection value; and a determining module, configured to determine a light intensity calibration coefficient corresponding to a current environment temperature value based on a corresponding relationship between a temperature and the light intensity calibration coefficient, and to determine the screen light intensity value of the terminal based on the determined light intensity calibration coefficient and the screen light intensity detection value.

In some embodiments, the light sensor includes a plurality of sensing channels, and for each sensing channel of the plurality of sensing channels, the determining module determines the corresponding relationship between the temperature and the light intensity calibration coefficient in the following manner determining a first screen light intensity detection value, the first screen light intensity detection value including a screen light intensity detection value collected by the light sensor at a reference environment temperature; adjusting a temperature of an environment where the light sensor is located with a predetermined temperature adjustment step based on the reference environment temperature, and synchronously obtaining a second screen light intensity detection value collected by the light sensor at the adjusted temperature; when an absolute value of a difference between the second screen light intensity detection value and the first screen light intensity detection value is greater than an error threshold, determining a first temperature corresponding to the second screen light intensity detection value; and determining a ratio between the first screen light intensity detection value and the second screen light intensity detection value as a light intensity calibration coefficient corresponding to the first temperature.

In some embodiments, the determining module determines the corresponding relationship between the temperature and the light intensity calibration coefficient in the following manner determining a temperature range in which the terminal uses the light sensor; determining a first number of first temperature ranges based on a predetermined temperature adjustment step and a difference between the highest temperature and the lowest temperature of the temperature range; and for the first number of first temperature ranges, determining a light intensity calibration coefficient corresponding to each first temperature range respectively.

In some embodiments, the determining module determines the first number of first temperature ranges based on the predetermined temperature adjustment step and the difference between the highest temperature and the lowest temperature of the temperature range in the following manner determining a ratio between the difference between the highest temperature and the lowest temperature of the temperature range and the predetermined temperature adjustment step as the first number.

In some embodiments, the determining module determines the corresponding relationship between the temperature and the light intensity calibration coefficient in the following manner determining a first screen light intensity detection value, the first screen light intensity detection value including a screen light intensity detection value collected by the light sensor at a reference environment temperature; adjusting a temperature of an environment where the light sensor is located with a predetermined temperature adjustment step based on the reference environment temperature, and synchronously obtaining a plurality of second screen light intensity detection values collected by the light sensor at the adjusted temperature; and determining a ratio between the first screen light intensity detection value and an average value of the plurality of second screen light intensity detection values as a light intensity calibration coefficient corresponding to the adjusted temperature.

In some embodiments, the determining module determines the screen light intensity value of the terminal based on the determined light intensity calibration coefficient and the screen light intensity detection value in the following manner adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

According to another aspect of the embodiments of the present disclosure, there is provided an apparatus for determining a screen light intensity value, including: a processor; and memory for storing processor-executable instructions, wherein, the processor is configured to execute the method for determining the screen light intensity value according to any one of the foregoing.

According to another aspect of the embodiments of the present disclosure, there is provided a non-transitory computer-readable storage medium, when instructions in the storage medium are executed by a processor of a mobile terminal, enabling the mobile terminal to execute the method for determining the screen light intensity value according to any one of the foregoing.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

Figure 1:
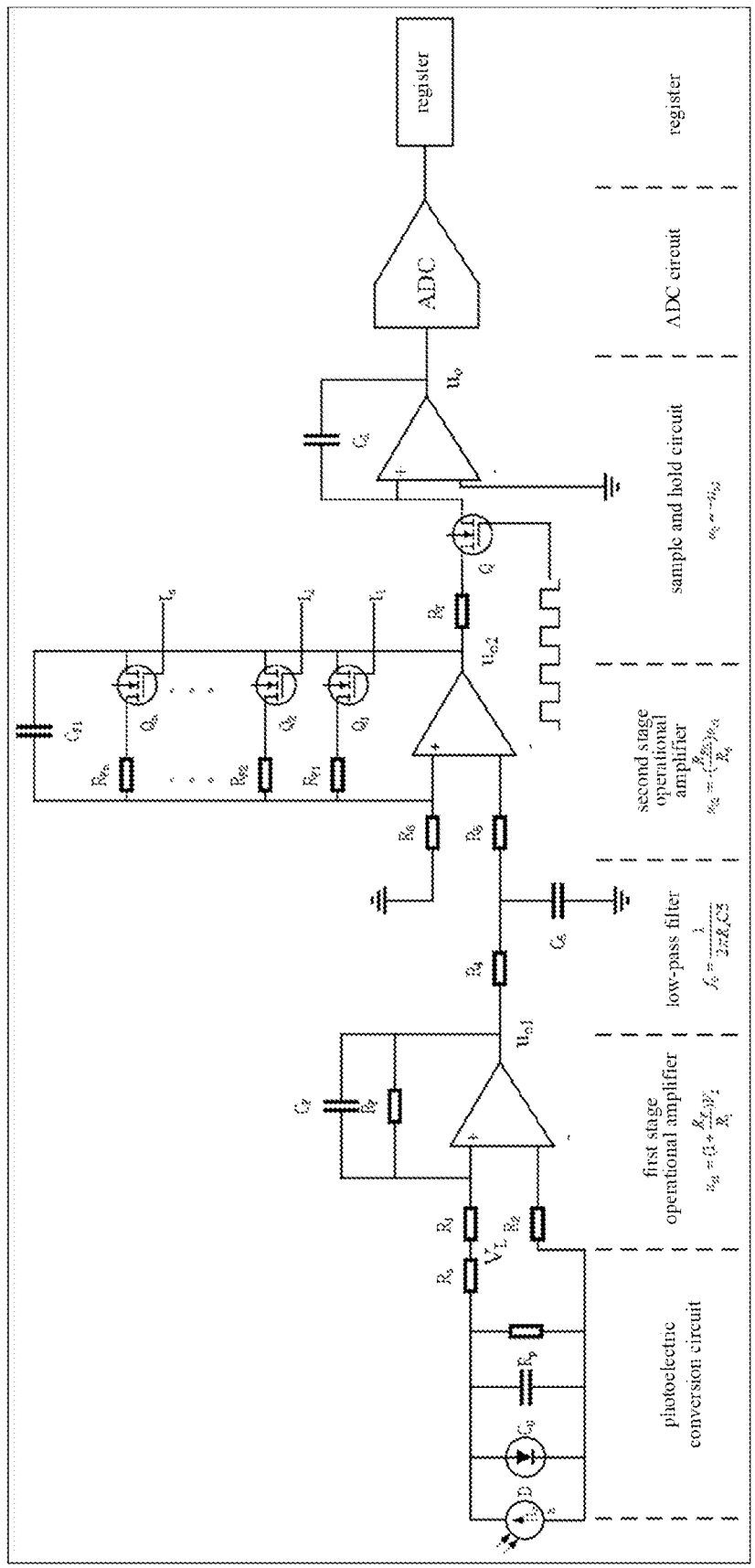
FIG. 1 is a schematic diagram of an equivalent signal model of a sensor analog chip circuit of a light sensor according to some embodiments of the present disclosure.

Description will now be made in detail to exemplary embodiments, examples of which are illustrated in the accompanying drawings. The following description refers to the accompanying drawings in which the same numbers in different drawings represent the same or similar elements unless otherwise indicated. The embodiments described in the following exemplary embodiments do not represent all embodiments consistent with the present disclosure. Instead, they are only examples of apparatuses and methods consistent with aspects of the present disclosure as detailed in the appended claims.

The terminal is provided with a light sensor, which serves to sense the intensity of the environment light and feedback the detection result of the environment light intensity to the terminal, and then the terminal adjusts the brightness of the screen display according to the feedback result, such that the screen display brightness is adapted to the external environment, which brings a better display effect to users. For example, in a dark environment, the terminal screen is adjusted to a lower brightness for display, and in a bright environment, the terminal screen is adjusted to a higher brightness for display. The light sensor is composed of the semiconductor material, and the semiconductor material and the light path medium will be affected by the environment temperature, and the detection data will change accordingly, resulting in inaccurate detection data of the light sensor.

In the terminal product provided with a display screen, the light sensor may be disposed below the screen of the terminal and serves to sense the intensity of the environment light and feedback the detection result of the environment light intensity to the terminal. The terminal adjusts the brightness of the screen display according to the feedback result, such that the screen display brightness is adapted to the external environment, which brings a better display effect to the user. For example, in a dark environment, the terminal screen is adjusted to a lower brightness for display, and in a bright environment, the terminal screen is adjusted to a higher brightness for display. The light sensor can be an under-screen light sensor or a conventional light sensor under the glass cover of the screen, the light sensor is composed of semiconductor material, and the semiconductor material and the optical path medium will be affected by the environment temperature, and the detection data will change accordingly, resulting in different detection data of the light sensor under different environment temperatures.

Therefore, the present disclosure provides a method for determining the screen light intensity value, which considers the influence of the environment temperature to calibrate a screen light intensity detection value detected by the light sensor by using the obtained current environment temperature, so as to obtain the screen light intensity detection value that is not affected by the temperature after calibration.

FIG. 1 is a schematic diagram of the equivalent signal model of a sensor analog chip circuit of the light sensor according to some embodiments of the present disclosure, and as shown in FIG. 1, the sensor analog chip circuit includes a photoelectric conversion circuit, a first stage operational amplifier circuit, a low-pass filter circuit, a second stage operational amplifier circuit, a sample and hold circuit, a converter ADC circuit, a register, etc.

Figure 2:
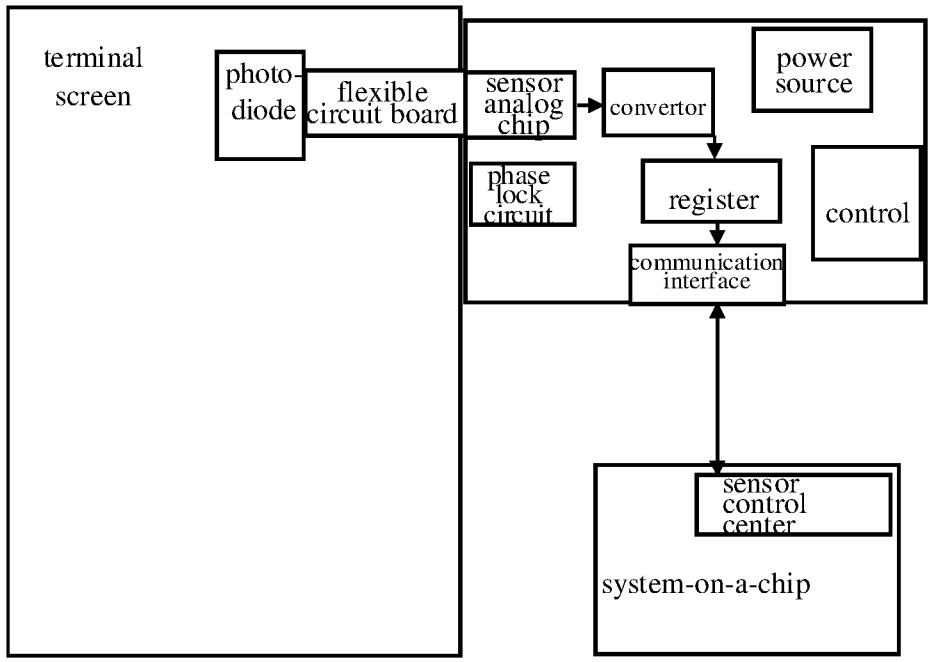
FIG. 2 is a photodiode circuit diagram of a light sensor provided inside a terminal screen according to some embodiments of the present disclosure.

FIG. 2 is a photodiode circuit diagram of a light sensor provided inside a terminal screen in accordance with some embodiments of the present disclosure. As shown in FIG. 2, the photodiode is arranged on the upper part of the light sensor chip, and the light sensor chip is arranged under the terminal screen. Optical media that light passes through, such as glass covers, screens, etc., will be affected by the environment temperature, and the photodiode, the sensor analog chip circuit, etc. of the light sensor will also be affected by the environment temperature during the conduction process.

Figure 3:
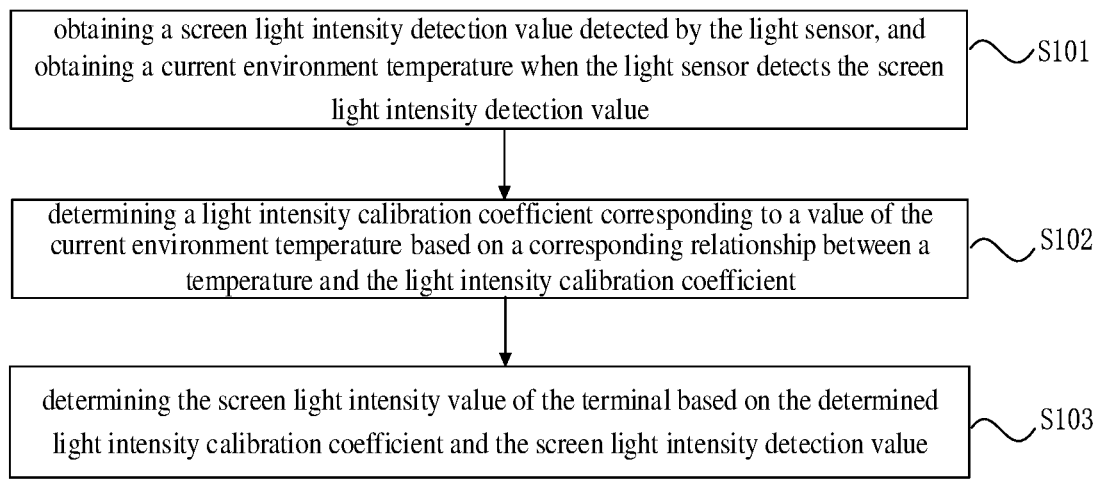
FIG. 3 is a flowchart showing a method for determining a screen light intensity value according to some embodiments of the present disclosure.

FIG. 3 is a flowchart showing a method for determining the screen light intensity value according to some embodiments of the present disclosure, which is applied to a terminal. The terminal can be a mobile phone, a tablet computer, a wearable device, etc., and the terminal is provided with a light sensor. The light sensor can be an under-screen light sensor or a conventional light sensor under the glass cover of the screen, wherein, the under-screen light sensor adopts the under-screen photosensitive technology and utilizes the light transmittance of the terminal screen, such that the light sensor set under the screen can receive the light penetrating through the screen and sense the change of the environment light. As shown in FIG. 3, the method for determining the screen light intensity value includes the following steps.

In step S101, the screen light intensity detection value detected by the light sensor is obtained, and the current environment temperature when the light sensor detects the screen light intensity detection value is obtained.

In step S102, a light intensity calibration coefficient corresponding to a current environment temperature value is determined based on a corresponding relationship between the temperature and the light intensity calibration coefficient.

In step S103, the screen light intensity value of the terminal is determined based on the determined light intensity calibration coefficient and the screen light intensity detection value.

In some embodiments of the present disclosure, the terminal is provided with a light sensor for obtaining environment light information of terminal environment, and the environment light information can be used as the basis for the terminal to adjust the screen display brightness. The terminal adjusts the brightness of the screen display according to the environment light information so that the brightness of the screen display adapts to the external environment. The terminal obtains the screen light intensity detection value detected by the light sensor, and obtains the current environment temperature of the screen light intensity detection value detected by the light sensor.

It can be understood that in some embodiments of the present disclosure, the current environment temperature when the light sensor detects the screen light intensity detection value can be obtained by integrating a temperature sensor near the light sensor or inside the light sensor, or by using temperature data of the terminal. The light intensity calibration coefficient is used to calibrate the light intensity detection value detected by the light sensor to eliminate the detection error caused by the change in environment temperature. There is a corresponding relationship between the temperature and the light intensity calibration coefficient, where different temperatures correspond to different light intensity calibration coefficients, and the detection value of light intensity on the screen detected by the light sensor is affected by the environment temperature and changes with the change of the environment temperature. Based on the current environment temperature of the light intensity detection value of the light sensor detection screen, the light intensity calibration coefficient corresponding to the current environment temperature can be determined by using the corresponding relationship between the temperature and the light intensity calibration coefficient. The screen light intensity value is determined by using the obtained light intensity calibration coefficient and the screen light intensity detection value, and the screen light intensity value obtained is an accurate value not affected by the temperature.

According to some embodiments of the present disclosure, by obtaining the screen light intensity detection value detected by the light sensor and the current environment temperature when the light sensor detects the screen light intensity detection value, and based on the corresponding relationship between the temperature and the light intensity calibration coefficient, the light intensity calibration coefficient corresponding to the current environment temperature is determined. Based on the light intensity calibration coefficient corresponding to the determined current environment temperature value and the screen light intensity detection value, the screen light intensity value of the terminal is determined to eliminate the influence of the light intensity detection value caused by the change of environment temperature, an accurate screen light intensity value of the terminal is obtained, which provides support for optimizing the use experience of the terminal equipment.

Figure 4:
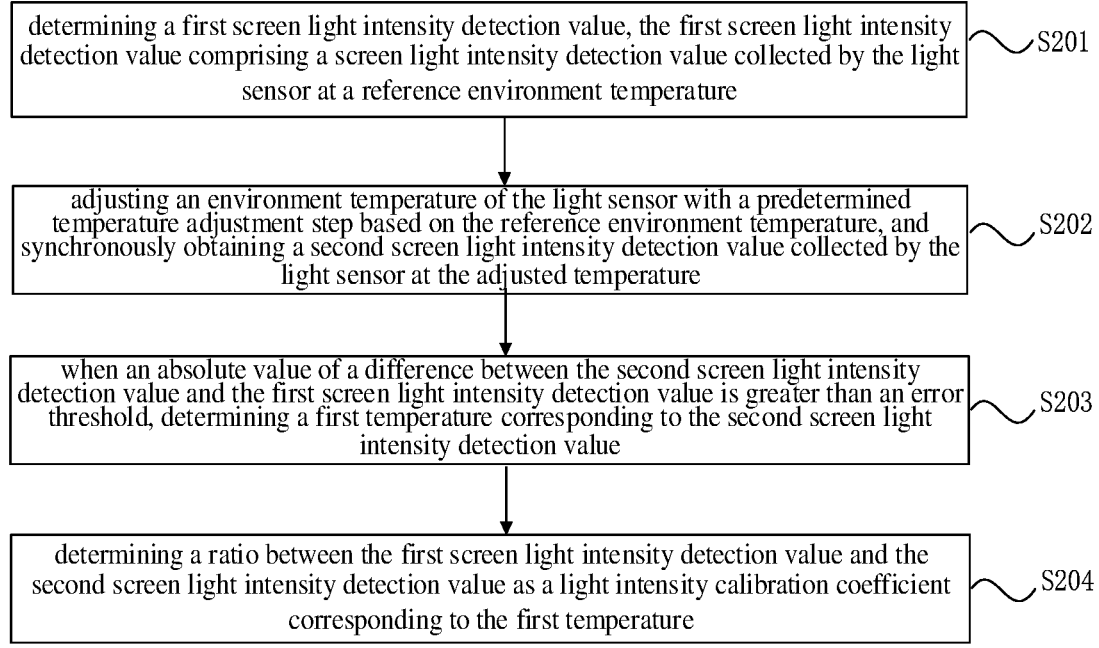
FIG. 4 is a flowchart showing a method for determining a corresponding relationship between a temperature and a light intensity calibration coefficient according to some embodiments of the present disclosure.

FIG. 4 is a flowchart showing a method for determining the corresponding relationship between the temperature and the light intensity calibration coefficient according to some embodiments of the present disclosure, and as shown in FIG. 4, the method for determining the corresponding relationship between the temperature and the light intensity calibration coefficient includes the following steps.

In step S201, a first screen light intensity detection value is determined, and the first screen light intensity detection value includes the screen light intensity detection value collected by the light sensor at a reference environment temperature.

In step S202, based on the reference environment temperature, an environment temperature of the light sensor is adjusted with a predetermined temperature adjustment step, and a second screen light intensity detection value collected by the light sensor at the adjusted temperature is synchronously obtained.

In step S203, if the absolute value of a difference between the second screen light intensity detection value and the first screen light intensity detection value is greater than the error threshold, the first temperature corresponding to the second screen light intensity detection value is determined.

In step S204, a ratio between the first screen light intensity detection value and the second screen light intensity detection value is determined as a light intensity calibration coefficient corresponding to the first temperature.

In some embodiments of the present disclosure, the light sensor includes a plurality of sensing channels, and the screen light intensity detection value detected by the light sensor includes converter count values of the light intensity detection values of the plurality of sensing channels. The screen light intensity detection value Lux' detected by the light sensor can be expressed, through the light intensity detection values of the plurality of sensing channels, as follows:

$$Lux' = \begin{vmatrix} Lux'_{1m} \\ \vdots \\ Lux'_{nm} \end{vmatrix} = \begin{vmatrix} K_{11}*channel_{11} & \cdots & K_{1m}*channel_{1m} \\ \vdots & \ddots & \vdots \\ K_{n1}*channel_{n1} & \cdots & K_{nm}*channel_{nm} \end{vmatrix}$$

where m represents the m sensing channels of the sensor, n represents different types of the light source spectrum, and $channel_{nm}$ is a converter count value corresponding to the n-th light source spectrum collected by the m-th sensing channel in the sensor, that is, the register value of the sensor. $K_{nm}$ is the fitting coefficient, and n different light source spectra correspond to different $K_{nm}$ fitting coefficients.

In some embodiments of the present disclosure, when determining the corresponding relationship between the temperature and the light intensity calibration coefficient, the light-emitting light source and its corresponding illumination remain the same under different temperature conditions, and the illumination of the light-emitting light source does not exceed a predetermined light intensity threshold. For each sensing channel in multiple sensing channels, the corresponding relationship between the temperature and the light intensity calibration coefficient is determined to calibrate the light intensity detection values of multiple sensing channels. The screen light intensity detection value of the terminal collected by the light sensor at the reference environment temperature is determined, and the screen light intensity detection value of the terminal collected by the light sensor at the reference environment temperature is a first screen light intensity detection value. The reference environment temperature and/or the predetermined temperature adjustment step can be set according to the use conditions of the terminal, or can be determined according to experimental data. For example, the reference environment temperature can be set to a fixed temperature value, for example, the fixed temperature value can be 25° C., and the predetermined temperature adjustment step can be 5° C. or 10° C. Within a certain temperature range, the smaller the predetermined temperature adjustment step is, the finer the division is in the temperature range, and the more accurate the determined light intensity calibration coefficient is to the screen light intensity detection value. The temperature of the environment temperature of the light sensor is adjusted with a predetermined temperature adjustment step, and the light intensity detection value of the terminal screen collected by the light sensor is obtained after the temperature adjustment, that is, the light intensity value of the second screen light intensity detection value.

It is understandable that the temperature adjustment may be an adjustment to increase or decrease the temperature, and the temperature adjustment may be multiple adjustments based on the predetermined temperature adjustment step. When the absolute value of the difference between the second screen light intensity detection value after the temperature adjustment and the first screen light intensity detection value of the reference environment temperature is greater than the error threshold, the light intensity detection value generated by the temperature change changes greatly, and the adjusted first temperature corresponding to the second screen light intensity detection value is determined. Also, the light intensity calibration coefficient corresponding to the first temperature is determined, and the light intensity calibration coefficient corresponding to the first temperature is the ratio between the first screen light intensity detection value and the second screen light intensity detection value.

According to some embodiments of the present disclosure, for each sensing channel of the plurality of sensing channels included in the light sensor, the screen light intensity detection value collected by the light sensor at the reference environment temperature is determined as a first screen light intensity detection value, and the temperature is adjusted based on a predetermined temperature adjustment step, a second screen light intensity detection value corresponding to the adjusted temperature is determined, and when it is determined that an absolute value of a difference between the second screen light intensity detection value and the first screen light intensity detection value is greater than an error threshold, a first temperature corresponding to the second screen light intensity detection value is determined; and a ratio between the first screen light intensity detection value and the second screen light intensity detection value is determined as a light intensity calibration coefficient corresponding to the first temperature, thereby determining the corresponding relationship between the temperature and the light intensity calibration coefficient, and calibrating the screen light intensity detection value of the plurality of sensing channels of the light sensor at the current environment temperature based on the corresponding relationship, which provides a basis for obtaining an accurate screen light intensity value of the terminal.

Figure 5:
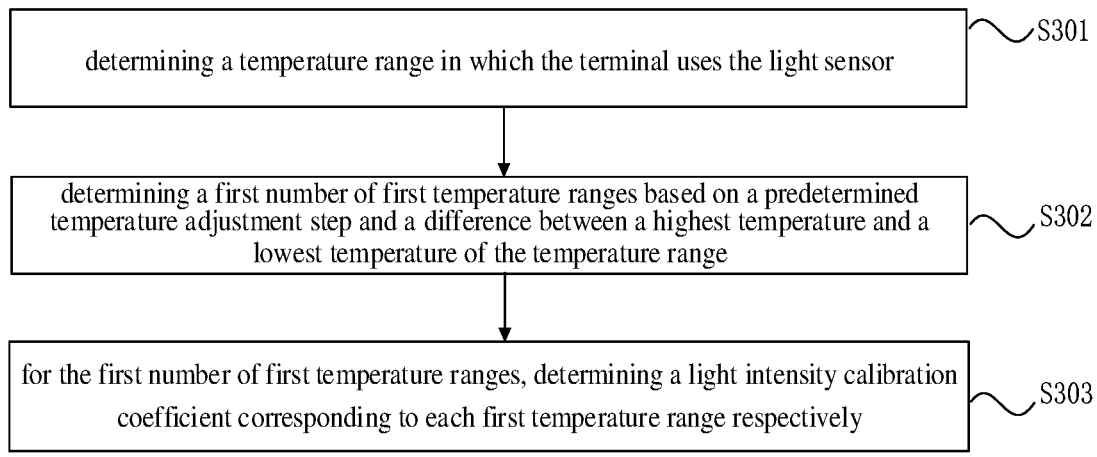
FIG. 5 is a flowchart showing a method for determining the corresponding relationship between the temperature and the light intensity calibration coefficient according to some embodiments of the present disclosure.

FIG. 5 is a flowchart showing a method for determining the corresponding relationship between the temperature and the light intensity calibration coefficient according to some embodiments of the present disclosure, and as shown in FIG. 5, the method for determining the corresponding relationship between the temperature and the light intensity calibration coefficient includes the following steps.

In step S301, a temperature range in which the terminal uses the light sensor is determined.

In step S302, a first number of first temperature ranges are determined based on a predetermined temperature adjustment step and a difference between the highest temperature and the lowest temperature of the temperature range.

In step S303, for the first number of first temperature ranges, a light intensity calibration coefficient corresponding to each first temperature range is determined respectively.

In some embodiments of the present disclosure, the screen light intensity detection value detected by the light sensor is affected by the temperature, and the light intensity calibration coefficient is used to calibrate the screen light intensity detection value to eliminate the temperature influence. When determining the corresponding relationship between the temperature and the light intensity calibration coefficient, the operating temperature range in which the terminal uses the light sensor to detect the screen light intensity is determined, the temperature range includes the highest temperature when the terminal uses the light sensor to detect the screen light intensity and the lowest temperature when the screen light intensity is detected. It is understandable that the temperature range in which the terminal uses the light sensor may be determined based on the temperature conditions in the daily use scene of the terminal. Based on the predetermined temperature adjustment step and the difference between the highest temperature and the lowest temperature of the temperature range, a first number of first temperature ranges are determined, and the temperature range in which the terminal uses the light sensor includes a plurality of first temperature ranges. The light intensity calibration coefficient corresponding to the first temperature range may be a light intensity calibration coefficient corresponding to the adjusted environment temperature, the environment temperature of the light sensor is adjusted based on the predetermined temperature adjustment step within the first temperature range. For the first number of first temperature ranges, the light intensity calibration coefficient corresponding to each first temperature range is determined respectively. For example, the light sensor includes m sensing channels, the reference environment temperature is $t_0$, and the predetermined temperature adjustment step is $\delta t$ under a certain optical environment, the adjusted temperature is $(t_0+\delta t)$, and the screen light intensity detection value collected by the i-th sensing channel of the light sensor at the reference environment temperature, that is, the first screen light intensity detection value, is $Data_{channel-i-t_0}$, the light intensity detection value collected at the adjusted temperature, that is, the second screen light intensity detection value, is $Data_{Channel-i-(t_0+\delta t)}$, the light intensity calibration coefficient corresponding to the adjusted temperature of the i-th sensing channel is $K_{t-channel-i}$, and $K_{(t_0+\delta t)-channel-i}$ corresponding to the adjusted temperature $(t_0+\delta t)$ can be expressed as $K_{(t_0+\delta t)-channel-i} = Data_{channel-i-t_0} / Data_{Channel-i-(t_0+\delta t)}$, that is, for the first temperature range of $t_0$ to $(t_0+\delta t)$, the corresponding light intensity calibration coefficient is $K_{(t_0+\delta t)}$.

According to some embodiments of the present disclosure, the temperature range in which the terminal uses the light sensor is determined, and the first number of first temperature ranges are determined based on the predetermined temperature adjustment step and the difference between the highest temperature and the lowest temperature of the temperature range, and for the first number of first temperature ranges, a light intensity calibration coefficient corresponding to each first temperature range is determined respectively, and the light intensity calibration coefficients corresponding to different first temperature ranges can be determined respectively. In this way, the corresponding relationship between the temperature and the light intensity calibration coefficient is determined, and the screen light intensity detection value at the current environment temperature is calibrated based on the corresponding relationship, which provides a basis for obtaining an accurate screen light intensity value of the terminal.

Figure 6:
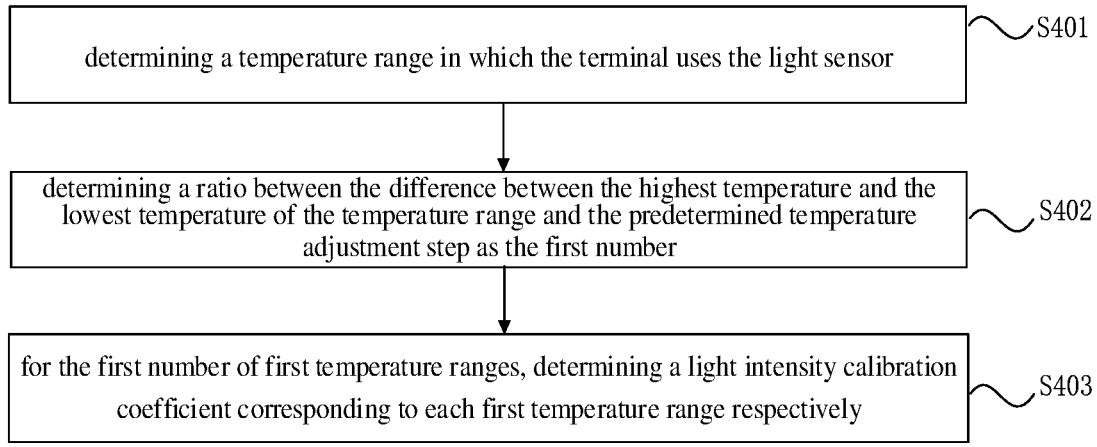
FIG. 6 is a flowchart showing a method for determining the corresponding relationship between the temperature and the light intensity calibration coefficient according to some embodiments of the present disclosure.

FIG. 6 is a flowchart showing a method for determining the corresponding relationship between the temperature and the light intensity calibration coefficient according to some embodiments of the present disclosure, and as shown in FIG. 6, the method for determining the corresponding relationship between the temperature and the light intensity calibration coefficient includes the following steps.

In step S401, a temperature range in which the terminal uses the light sensor is determined.

In step S402, a ratio between the difference between the highest temperature and the lowest temperature of the temperature range and the predetermined temperature adjustment step is determined as the first number.

In step S403, for the first number of first temperature ranges, a light intensity calibration coefficient corresponding to each first temperature range is determined respectively.

According to some embodiments of the present disclosure, the screen light intensity detection value detected by the light sensor is affected by the temperature, and the light intensity calibration coefficient is used to calibrate the screen light intensity detection value to eliminate the temperature influence. When determining the corresponding relationship between the temperature and the light intensity calibration coefficient, the operating temperature range in which the terminal uses the light sensor to detect the screen light intensity is determined, the temperature range includes the highest temperature when the terminal uses the light sensor to detect the screen light intensity and the lowest temperature when the screen light intensity is detected. It is understandable that the temperature range in which the terminal uses the light sensor may be determined based on the temperature conditions in the daily use scene of the terminal. Based on the predetermined temperature adjustment step and the difference between the highest temperature and the lowest temperature of the temperature range, a first number of first temperature ranges are determined. The ratio between the difference between the highest temperature and the lowest temperature of the temperature range and the predetermined temperature adjustment step is determined as the first number. The light intensity calibration coefficient corresponding to the first temperature range may be a light intensity calibration coefficient corresponding to the adjusted environment temperature, the environment temperature of the light sensor is adjusted based on the predetermined temperature adjustment step within the first temperature range. For the first number of first temperature ranges, the light intensity calibration coefficient corresponding to each first temperature range is determined respectively. For example, the light sensor includes m sensing channels, the highest temperature of the temperature range in which the light sensor detects the screen light intensity detection value is $t_{max}$, the lowest temperature of the temperature range is $t_{min}$, and the difference between the two is ($t_{max}-t_{min}$) The reference environment temperature is $t_0$, and the predetermined temperature adjustment step is δt under a certain optical environment, the highest temperature and the lowest temperature of the temperature range include the first number of first temperature ranges, the first number is j, $j=(t_{max}-t_{min})/δt$. The temperature after the temperature adjustment based on the reference environment temperature $t_0$ is ($t_0+δt$), and the screen light intensity detection value collected by the i-th sensing channel of the light sensor at the reference environment temperature, that is, the first screen light intensity detection value, is $Data_{channel-i-t_0}$, the light intensity detection value collected at the adjusted temperature, that is, the second screen light intensity detection value, is $Data_{channel-i-(t_0+δt)}$, the light intensity calibration coefficient corresponding to the adjusted temperature of the i-th sensing channel is $K_{t-channel-i}$, and $K_{(t_0+δt)-channel-i}$ corresponding to the adjusted temperature ($t_0+δt$) can be expressed as $K_{(t_0+δt)-channel-i}=Data_{channel-i-t_0}/Data_{channel-i-(t_0+δt)}$, that is, for the first temperature range of $t_0$ to ($t_0+δt$), the corresponding light intensity calibration coefficient is $K_{(t_0+δt)}$.

According to some embodiments of the present disclosure, the temperature range in which the terminal uses the light sensor is determined, and the first number of first temperature ranges are determined based on the predetermined temperature adjustment step and the difference between the highest temperature and the lowest temperature of the temperature range, and the first number is the radio between the difference between the highest temperature and the lowest temperature of the temperature range and the predetermined temperature adjustment step, a light intensity calibration coefficient corresponding to each first temperature range is determined respectively, and the light intensity calibration coefficients corresponding to different first temperature ranges can be determined respectively. In this way, the corresponding relationship between the temperature and the light intensity calibration coefficient is determined, and the screen light intensity detection value at the current environment temperature is calibrated based on the corresponding relationship, which provides a basis for obtaining an accurate screen light intensity value of the terminal.

Figure 7:
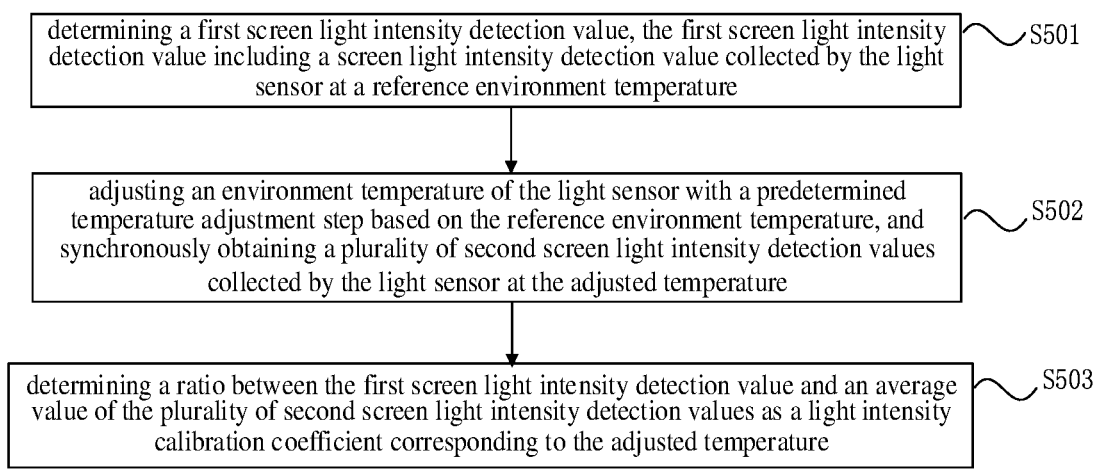
FIG. 7 is a flowchart showing a method for determining the corresponding relationship between the temperature and the light intensity calibration coefficient according to some embodiments of the present disclosure.

FIG. 7 is a flowchart showing a method for determining the corresponding relationship between the temperature and the light intensity calibration coefficient according to some embodiments of the present disclosure, and as shown in FIG. 7, the method for determining the corresponding relationship between the temperature and the light intensity calibration coefficient includes the following steps.

In step S501, a first screen light intensity detection value is determined, the first screen light intensity detection value including a screen light intensity detection value collected by the light sensor at a reference environment temperature.

In step S502, an environment temperature of the light sensor is adjusted with a predetermined temperature adjustment step based on the reference environment temperature, and a plurality of second screen light intensity detection values collected by the light sensor at the adjusted temperature is obtained synchronously.

In step S503, the ratio between the first screen light intensity detection value and the average value of the plurality of second screen light intensity detection values is determined as the light intensity calibration coefficient corresponding to the adjusted temperature.

In some embodiments of the present disclosure, when determining the corresponding relationship between the temperature and the light intensity calibration coefficient, the light-emitting light source and its corresponding illuminance remain the same under different temperature conditions, and the illuminance of the light-emitting light source does not exceed a predetermined light intensity threshold. Under the reference environment temperature, the first screen light intensity detection value of the terminal screen collected by the light sensor is determined. The reference environment temperature can be set to a fixed temperature value, for example, the fixed temperature value can be taken as 25° C., and the predetermined temperature adjustment step can be 5° C. or 10° C. It is understandable that within a certain temperature range, the smaller the value of the predetermined temperature adjustment step is, the finer the division within the temperature range is, and the more accurate the determined light intensity calibration coefficient is for the screen light intensity detection value. The temperature adjustment for the environment temperature of the light sensor is performed with a predetermined temperature adjustment step, and the screen light intensity detection value of the terminal collected by the light sensor after the temperature adjustment, that is, the second screen light intensity detection value, is obtained. After the temperature is adjusted, the light sensor collects a predetermined number of screen light intensity detection values of the terminal, that is, obtains a plurality of second screen light intensity detection values corresponding to the adjusted temperature, and determines the average value of the plurality of second screen light intensity detection values. The ratio between the first screen light intensity detection value and the average value of the plurality of second screen light intensity detection values is determined as the light intensity calibration coefficient corresponding to the adjusted temperature.

It is understandable that based on the reference environment temperature, the environment temperature of the light sensor is adjusted with a predetermined temperature adjustment step, and in this process, the light intensity calibration coefficient corresponding to each adjusted temperature can be determined respectively. For example, when the reference environment temperature value is 25° C., the predetermined temperature adjustment step is 5° C. At 25° C., the screen light intensity detection value collected by the light sensor, that is, the first screen light intensity detection value is determined. Based on the reference environment temperature of 25° C., the environment temperature of the light sensor is adjusted with an adjustment step of 5° C., the adjusted environment temperature is 30° C., and the plurality of second screen light intensity detection values collected by the light sensor at 30° C. is obtained. There may be a predetermined number of second screen light intensity detection values, the predetermined number can be determined as 5, 10 or other values as needed. When the predetermined number is 10, the 10 second screen light intensity detection values collected by the light sensor at 30° C. is obtained, the average value of the 10 second screen light intensity detection values is determined, and the radio between the first screen light intensity detection value and the average value of the 10 second screen light intensity detection values is determined as the corresponding light intensity calibration coefficient at 30° C. Then, the environment temperature of the light sensor is adjusted with the adjustment step of 5° C., the adjusted environment temperature is 35° C., the 10 second screen light intensity detection values collected by the light sensor at 35° C. are obtained, and the corresponding light intensity calibration coefficient at 35° C. is determined. The determining method is consistent with the above, and will not be repeated herein. By analogy, the temperature is adjusted separately within the temperature range in which the terminal uses the light sensor, and the corresponding relationship between the adjusted temperature and the light intensity calibration coefficient is determined.

According to some embodiments of the present disclosure, under the reference environment temperature, the first screen light intensity detection value of the screen collected by the light sensor at the reference environment temperature is determined, the temperature is adjusted based on predetermined temperature adjustment step, and the average value of the plurality of second screen light intensity detection values corresponding to the adjusted temperature is determined, and the ratio between the first screen light intensity detection value and an average value of the plurality of second screen light intensity detection values is determined as a light intensity calibration coefficient corresponding to the adjusted temperature, so as to determine the corresponding relationship between the temperature and the light intensity calibration coefficient, the screen light intensity detection value at the current environment temperature is calibrated based on the corresponding relationship, which provides a basis for obtaining an accurate screen light intensity value of the terminal.

Figure 8:
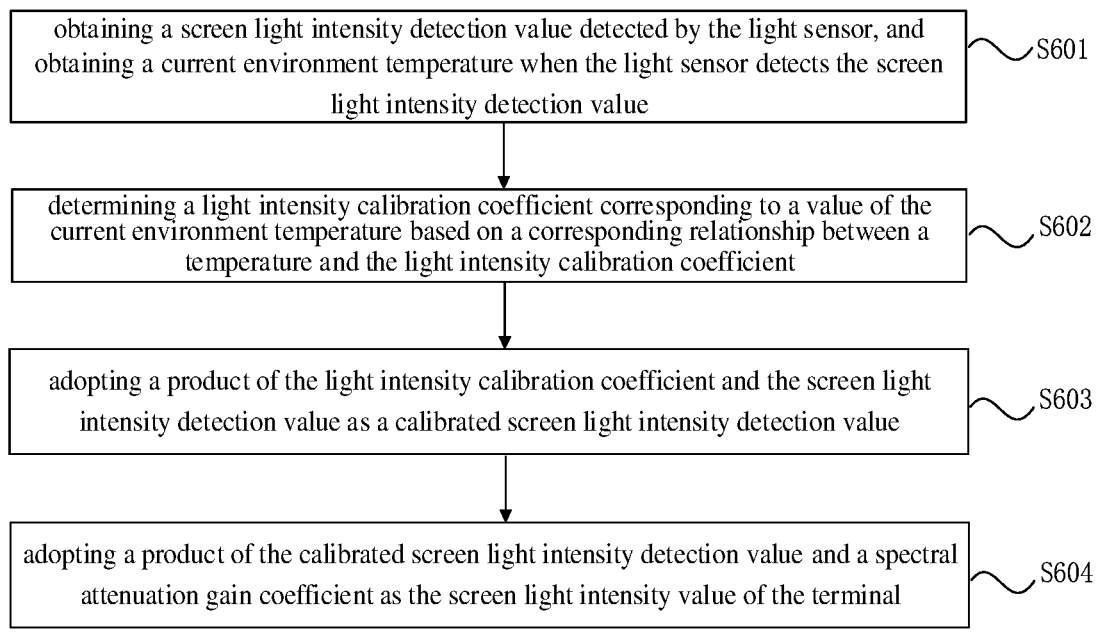
FIG. 8 is a flowchart showing g a method for determining a screen light intensity value according to some embodiments of the present disclosure.

FIG. 8 is a flowchart showing a method for determining a screen light intensity value according to some embodiments of the present disclosure, and as shown in FIG. 8, the method for determining the screen light intensity value includes the following steps.

In step S601, a screen light intensity detection value detected by the light sensor is obtained, and a current environment temperature when the light sensor detects the screen light intensity detection value is obtained.

In step S602, a light intensity calibration coefficient corresponding to a value of the current environment temperature is determined based on a corresponding relationship between the temperature and the light intensity calibration coefficient.

In step S603, a product of the light intensity calibration coefficient and the screen light intensity detection value is adopted as a calibrated screen light intensity detection value.

In step S604, a product of the calibrated screen light intensity detection value and a spectral attenuation gain coefficient is adopted as the screen light intensity value of the terminal.

In some embodiments of the present disclosure, the light sensor includes a plurality of sensing channels, and the screen light intensity detection value detected by the light sensor includes a converter count value of the light intensity detection values of the plurality of sensing channels. The screen light intensity detection value Lux' detected by the light sensor can be expressed, through the light intensity detection values of the plurality of sensing channels, as follows.

$$Lux' = \begin{vmatrix} Lux'_{1m} \\ \vdots \\ Lux'_{nm} \end{vmatrix} = \begin{vmatrix} K_{11}*\text{channel}_{11} & \cdots & K_{1m}*\text{channel}_{1m} \\ \vdots & \ddots & \vdots \\ K_{n1}*\text{channel}_{n1} & \cdots & K_{nm}*\text{channel}_{nm} \end{vmatrix}$$

wherein, m represents the m sensing channels of the sensor, n represents different types of the light source spectrum, and channel$_{nm}$ is a converter count value corresponding to the n-th light source spectrum collected by the m-th sensing channel in the sensor, that is, the register value of the sensor. K$_{nm}$ is a fitting coefficient, and n different light source spectra correspond to different K$_{nm}$ fitting coefficients. The spectral attenuation gain coefficient of the light sensor can be expressed with a vector, i.e., K=|K$_1$ ... K$_n$|. The screen light intensity value Lux of the terminal can be expressed as follows:

$$Lux = Lux' * K = \begin{vmatrix} Lux'_{1m} \\ \vdots \\ Lux'_{nm} \end{vmatrix} *|K_1 \cdots \cdots K_n|$$

$$= \begin{vmatrix} K_{11}*\text{channel}_{11} & \cdots & K_{1m}*Lux_{1m} \\ \vdots & \ddots & \vdots \\ K_{n1}*Lux_{n1} & \cdots & K_{nm}*Lux_{nm} \end{vmatrix} *|K_1 \cdots \cdots K_n|$$

$$= \begin{vmatrix} K_1*(K_{11}*\text{channel}_{11} + \cdots \cdots + K_{1m}*\text{channel}_{1m}) \\ \vdots \\ K_n*(K_{n1}*\text{channel}_{n1} + \cdots \cdots + K_{nm}*\text{channel}_{nm}) \end{vmatrix}$$

The current environment temperature when the light sensor detects the screen light intensity detection value is obtained, the screen light intensity value of the terminal is determined based on the determined light intensity calibration coefficient and the screen light intensity detection value, and the corresponding relationship between the temperature and the light intensity calibration coefficient is determined for each sensing channel of the plurality of sensing channels, to calibrate the light intensity detection values of the plurality of sensing channels.

The product of the light intensity calibration coefficient and the screen light intensity detection value is adopted as the calibrated screen light intensity detection value, that is, for Lux' in the above formula, the screen light intensity detection values corresponding to the m sensing channels in the matrix is calibrated, and the product of the calibrated screen light intensity detection value and the spectral attenuation gain coefficient is determined as the screen light intensity value of the terminal.

According to some embodiments of the present disclosure, by obtaining the screen light intensity detection value detected by the light sensor, and obtaining the current environment temperature when the light sensor detects the screen light intensity detection value, determining a light intensity calibration coefficient corresponding to the current environment temperature value based on the corresponding relationship between a temperature and the light intensity calibration coefficient, and adopting a product of the light intensity calibration coefficient and the screen light intensity detection value as a calibrated screen light intensity detection value, and adopting a product of the calibrated screen light intensity detection value and a spectral attenuation gain coefficient as the screen light intensity value of the terminal, the influence of the environment temperature on the light intensity detection value can be eliminated, and an accurate screen light intensity value of the terminal can be obtained.

Based on the same concept, the embodiments of the present disclosure also provide an apparatus for determining a screen light intensity value.

It can be understood that, in order to implement the above functions, the apparatus for determining the screen light intensity value provided by the embodiments of the present disclosure includes a corresponding hardware structure and/or software module for executing each function. In combination with the units and algorithm steps of the respective examples disclosed in the embodiments of the present disclosure, the embodiments of the present disclosure can be implemented in the form of hardware or a combination of hardware and computer software. Whether a function is executed by the hardware or a method of driving the hardware by the computer software depends on the specific application and design constraints of the technical solution. A person skilled in the art may use different methods to implement the described functions for each specific application, but such implementation should not be considered to exceed the scope of the technical solutions of the embodiments of the present disclosure.

Figure 9:
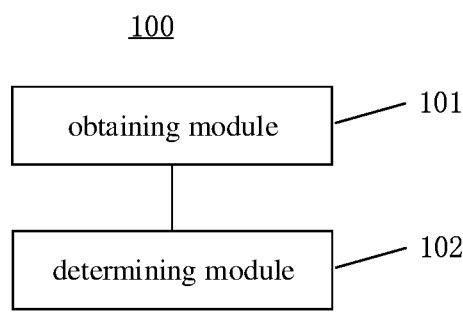
FIG. 9 is a block diagram showing an apparatus for determining a screen light intensity value according to some embodiments of the present disclosure.

FIG. 9 is a block diagram showing an apparatus for determining a screen light intensity value according to some embodiments of the present disclosure. The apparatus for determining the screen light intensity value is applied to a terminal, and the terminal is provided with a light sensor. As shown in FIG. 9, the apparatus 100 for determining the screen light intensity value includes: an obtaining module 101 and a determining module 102.

The obtaining module 101 is configured to obtain a screen light intensity detection value detected by the light sensor, and to obtain a current environment temperature when the light sensor detects the screen light intensity detection value.

The determining module 102 is configured to determine a light intensity calibration coefficient corresponding to a value of the current environment temperature based on a corresponding relationship between a temperature and the light intensity calibration coefficient, and to determine the screen light intensity value of the terminal based on the determined light intensity calibration coefficient and the screen light intensity detection value.

In some embodiments, the light sensor includes a plurality of sensing channels, and for each sensing channel of the plurality of sensing channels, the determining module 102 determines the corresponding relationship between the temperature and the light intensity calibration coefficient in the following manner determining a first screen light intensity detection value, the first screen light intensity detection value including a screen light intensity detection value collected by the light sensor at a reference environment temperature; adjusting an environment temperature of the light sensor with a predetermined temperature adjustment step based on the reference environment temperature, and synchronously obtaining a second screen light intensity detection value collected by the light sensor at the adjusted temperature; when an absolute value of a difference between the second screen light intensity detection value and the first screen light intensity detection value is greater than an error threshold, determining a first temperature corresponding to the second screen light intensity detection value; and determining a ratio between the first screen light intensity detection value and the second screen light intensity detection value as a light intensity calibration coefficient corresponding to the first temperature.

In some embodiments, the determining module 102 determines the corresponding relationship between the temperature and the light intensity calibration coefficient in the following manner determining a temperature range in which the terminal uses the light sensor; determining a first number of first temperature ranges based on a predetermined temperature adjustment step and a difference between the highest temperature and the lowest temperature of the temperature range; and for the first number of first temperature ranges, determining a light intensity calibration coefficient corresponding to each first temperature range respectively.

In some embodiments, the determining module 102 determines the first number of first temperature ranges based on the predetermined temperature adjustment step and the difference between the highest temperature and the lowest temperature of the temperature range in the following manner determining a ratio between the difference between the highest temperature and the lowest temperature of the temperature range and the predetermined temperature adjustment step as the first number.

In some embodiments, the determining module 102 determines the corresponding relationship between the temperature and the light intensity calibration coefficient in the following manner determining a first screen light intensity detection value, the first screen light intensity detection value including a screen light intensity detection value collected by the light sensor at a reference environment temperature; adjusting an environment temperature of the light sensor with a predetermined temperature adjustment step based on the reference environment temperature, and synchronously obtaining a plurality of second screen light intensity detection values collected by the light sensor at the adjusted temperature; and determining a ratio between the first screen light intensity detection value and an average value of the plurality of second screen light intensity detection values as a light intensity calibration coefficient corresponding to the adjusted temperature.

In some embodiments, the determining module 102 determines the screen light intensity value of the terminal based on the determined light intensity calibration coefficient and the screen light intensity detection value in the following manner adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

With respect to the apparatus in the above embodiments, the specific implementations for performing operations by individual modules therein have been described in detail in the embodiments regarding the methods, which will not be elaborated herein.

Figure 10:
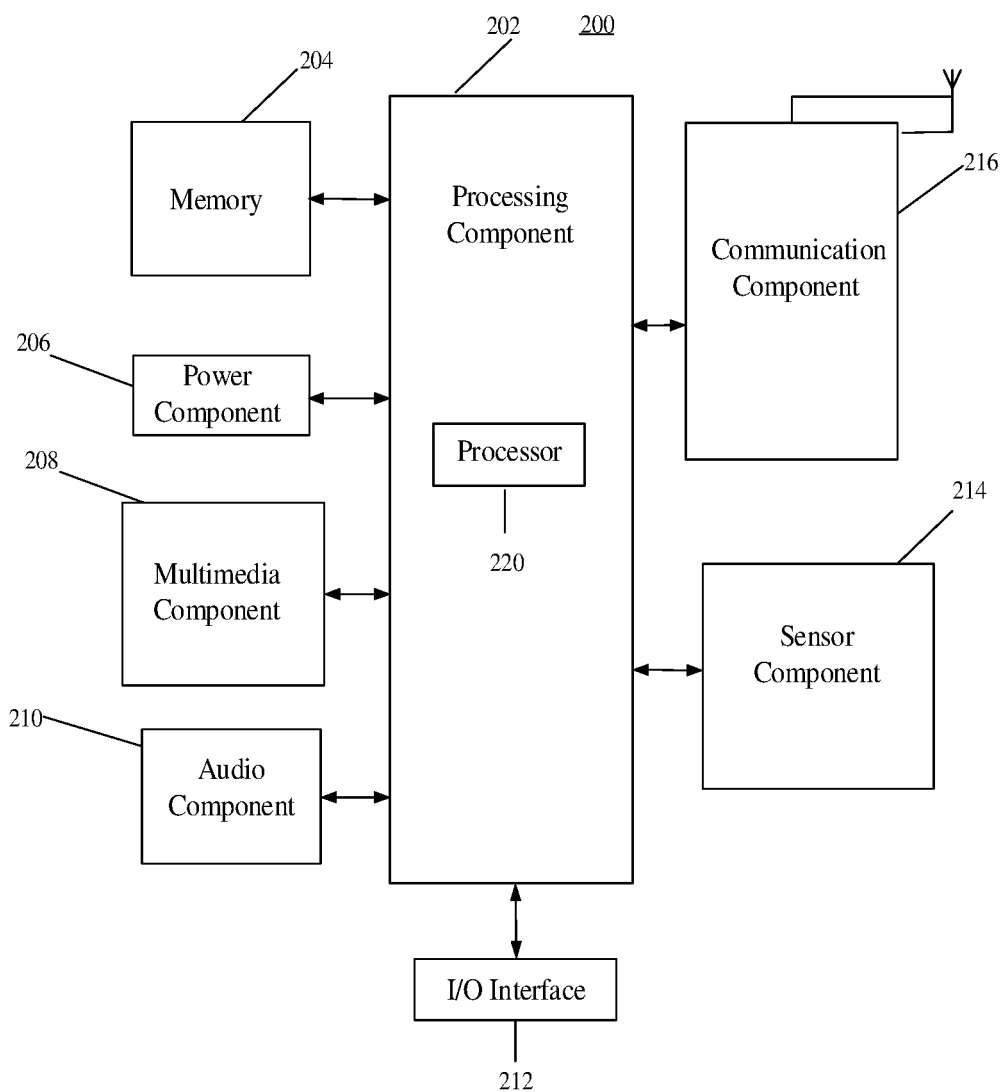
FIG. 10 is a block diagram showing an apparatus for determining a screen light intensity value according to some embodiments of the present disclosure.

FIG. 10 is a block diagram showing an apparatus 200 for determining a screen light intensity value according to some embodiments of the present disclosure. For example, the apparatus 200 can be a mobile phone, a computer, a digital broadcast terminal, a messaging device, a gaming console, a tablet, a medical device, exercise equipment, a personal digital assistant, and the like.

Referring to FIG. 10, the apparatus 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 can include a power management system, one or more power sources, and any other components associated with the generation, management, and distribution of power in the apparatus 200.

The multimedia component 208 includes a screen providing an output interface between the apparatus 200 and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors not only can sense a boundary of a touch or swipe action, but also can detect a period of time and a pressure associated with the touch or swipe action. In some embodiments, the multimedia component 208 includes a front camera and/or a rear camera. The front camera and/or the rear camera can receive an external multimedia datum while the apparatus 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the device 200. For instance, the sensor component 214 can detect an open/closed status of the apparatus 200, relative positioning of components such as the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200.

The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate wired or wireless communication between the apparatus 200 and other devices. The apparatus 200 can access a wireless network based on a communication standard, such as Wi-Fi, 2G, 3G, 4G, 5G, or a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the apparatus 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

In some embodiments, there is also provided a non-transitory computer-readable storage medium including instructions, such as included in the memory 204, executable by the processor 220 in the apparatus 200, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages:

by obtaining a screen light intensity detection value detected by the light sensor, and obtaining a current environment temperature when the light sensor detects the screen light intensity detection value, determining a light intensity calibration coefficient corresponding to a value of current environment temperature based on a corresponding relationship between a temperature and the light intensity calibration coefficient, and determining the screen light intensity value of the terminal based on the determined light intensity calibration coefficient corresponding to the current environment temperature value and the screen light intensity detection value, the influence of the environment temperature on the light intensity detection value can be eliminated, and an accurate screen light intensity value of the terminal can be obtained.

It can be understood that the "multiple" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," "said," and "the" are also intended to include the plural forms unless the context clearly indicates otherwise.

It can be further understood that although the terms such as "first" and "second" and the like are used to describe various information, these information should not be limited by these terms. The terms are only used to distinguish the same type of information from each other, and do not indicate a specific order or importance. In fact, the expressions such as "first" and "second" and the like can be used interchangeably. For instance, first information can also be referred to as second information without departing from the scope of the disclosure, and similarly, the second information can also be referred to as the first information.

It can be further understood that, unless otherwise specified, the wording "connection" includes a direct connection between two components without other components, and also includes an indirect connection between the two components with other elements.

It can be further understood that although the operations in the embodiments of the present disclosure are described in a specific order in the drawings, they should not be understood as requiring these operations to be performed in the specific order shown or in a serial order, or requiring all the shown operations to be performed to obtain the desired result. In certain circumstances, multitasking and parallel processing may be advantageous.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for determining a screen light intensity value, applied to a terminal provided with a light sensor, the method comprising:
    obtaining a screen light intensity detection value detected by the light sensor, and obtaining a current environment temperature when the light sensor detects the screen light intensity detection value;
    determining a light intensity calibration coefficient corresponding to a value of the current environment temperature based on a corresponding relationship between a temperature and the light intensity calibration coefficient; and
    determining the screen light intensity value of the terminal based on the determined light intensity calibration coefficient and the screen light intensity detection value,
    wherein the light sensor comprises a plurality of sensing channels, and wherein for each sensing channel of the plurality of sensing channels, the corresponding relationship between the temperature and the light intensity calibration coefficient is determined based on:
    determining a first screen light intensity detection value, the first screen light intensity detection value comprising a screen light intensity detection value collected by the light sensor at a reference environment temperature;
    adjusting an environment temperature of the light sensor with a predetermined temperature adjustment step based on the reference environment temperature, and synchronously obtaining a second screen light intensity detection value collected by the light sensor at the adjusted temperature;
    when an absolute value of a difference between the second screen light intensity detection value and the first screen light intensity detection value is greater than an error threshold, determining a first temperature corresponding to the second screen light intensity detection value; and
    determining a ratio between the first screen light intensity detection value and the second screen light intensity detection value as a light intensity calibration coefficient corresponding to the first temperature.

2. An apparatus for determining a screen light intensity value, applied to a terminal provided with a light sensor, the apparatus comprising:
    a memory device for storing processor-executable instructions;
    a processor configured to implement the method of claim 1.

3. A non-transitory computer-readable storage medium having instructions stored thereon for execution by a processor of a mobile terminal to enable the mobile terminal to execute the method for determining the screen light intensity value according to claim 1.

4. A terminal implementing the method of claim 1, comprising the screen, the light sensor, and a temperature sensor, wherein the terminal is configured to adjust the screen light intensity to compensate for influence of the environment temperature, measured by the temperature sensor, on the light intensity detection value.

5. A method for determining a screen light intensity value, applied to a terminal provided with a light sensor, the method comprising:
    obtaining a screen light intensity detection value detected by the light sensor, and obtaining a current environment temperature when the light sensor detects the screen light intensity detection value;
    determining a light intensity calibration coefficient corresponding to a value of the current environment temperature based on a corresponding relationship between a temperature and the light intensity calibration coefficient; and determining the screen light intensity value of the terminal based on the determined light intensity calibration coefficient and the screen light intensity detection value, wherein the corresponding relationship between the temperature and the light intensity calibration coefficient is determined in the following manner:

determining a temperature range in which the terminal uses the light sensor;

determining a first number of first temperature ranges based on a predetermined temperature adjustment step and a difference between a highest temperature and a lowest temperature of the temperature range; and for the first number of first temperature ranges, determining a light intensity calibration coefficient corresponding to each first temperature range respectively.

6. The method for determining the screen light intensity value according to claim 5, wherein the determining a first number of first temperature ranges based on a predetermined temperature adjustment step and a difference between the highest temperature and the lowest temperature of the temperature range comprises:

determining a ratio between the difference between the highest temperature and the lowest temperature of the temperature range and the predetermined temperature adjustment step as the first number.

7. An apparatus for determining a screen light intensity value, applied to a terminal provided with a light sensor, the apparatus comprising:

a memory device for storing processor-executable instructions;

a processor configured to implement the method of claim 5.

8. The apparatus for determining the screen light intensity value according to claim 7, wherein the processor is further configured to determine the first number of first temperature ranges based on the predetermined temperature adjustment step and the difference between the highest temperature and the lowest temperature of the temperature range by:

determining a ratio between the difference between the highest temperature and the lowest temperature of the temperature range and the predetermined temperature adjustment step as the first number.

9. A non-transitory computer-readable storage medium having instructions stored thereon for execution by a processor of a mobile terminal to enable the mobile terminal to execute the method for determining the screen light intensity value according to claim 5.

10. The non-transitory computer-readable storage medium according to claim 9, wherein the determining a first number of first temperature ranges based on a predetermined temperature adjustment step and a difference between the highest temperature and the lowest temperature of the temperature range comprises:

determining a ratio between the difference between the highest temperature and the lowest temperature of the temperature range and the predetermined temperature adjustment step as the first number.

11. A method for determining a screen light intensity value, applied to a terminal provided with a light sensor, the method comprising:

obtaining a screen light intensity detection value detected by the light sensor, and obtaining a current environment temperature when the light sensor detects the screen light intensity detection value;

determining a light intensity calibration coefficient corresponding to a value of the current environment temperature based on a corresponding relationship between a temperature and the light intensity calibration coefficient; and determining the screen light intensity value of the terminal based on the determined light intensity calibration coefficient and the screen light intensity detection value, wherein the corresponding relationship between the temperature and the light intensity calibration coefficient is determined based on:

determining a first screen light intensity detection value, the first screen light intensity detection value comprising a screen light intensity detection value collected by the light sensor at a reference environment temperature;

adjusting an environment temperature of the light sensor with a predetermined temperature adjustment step based on the reference environment temperature, and synchronously obtaining a plurality of second screen light intensity detection values collected by the light sensor at the adjusted temperature; and determining a ratio between the first screen light intensity detection value and an average value of the plurality of second screen light intensity detection values as a light intensity calibration coefficient corresponding to the adjusted temperature.

12. The method for determining the screen light intensity value according to claim 11, wherein the determining the screen light intensity value of the terminal based on the determined light intensity calibration coefficient and the screen light intensity detection value comprises:

adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

13. The terminal of claim 12, wherein:

the light sensor includes a plurality of m sensing channels, and the screen light intensity detection value detected by the light sensor includes converter count values of the light intensity detection values of the plurality of sensing channels;

the screen light intensity value Lux of the terminal is expressed as:

$$Lux = Lux' * K =$$

$$\begin{vmatrix} Lux'_{1m} \\ \vdots \\ Lux'_{nm} \end{vmatrix} * |K_1 \quad \ldots\ldots \quad K_n| = \begin{bmatrix} K_{11} * \text{channel}_{11} & \ldots & K_{1m} * Lux_{1m} \\ \vdots & \ddots & \vdots \\ K_{n1} * Lux_{n1} & \ldots & K_{nm} * Lux_{nm} \end{bmatrix} *$$

$$|K_1 \quad \ldots\ldots \quad K_n| = \begin{vmatrix} K_1 * (K_{11} * \text{channel}_{11} + \ldots\ldots + K_{1m} * \text{channel}_{1m}) \\ \vdots \\ K_n * (K_{n1} * \text{channel}_{n1} + \ldots\ldots + K_{nm} * \text{channel}_{nm}) \end{vmatrix}$$

where m represents the m sensing channels of the light sensor, n represents different types of light source spectrum, and $\text{channel}_{nm}$ is a converter count value corresponding to an n-th light source spectrum collected by the m-th sensing channel in the sensor; $K_{nm}$ is the fitting coefficient, and n different light source spectra correspond to different $K_{nm}$ fitting coefficients.

14. An apparatus for determining the screen light intensity value, applied to a terminal provided with a light sensor, the apparatus comprising:

a memory device for storing processor-executable instructions;

a processor configured to implement the method of claim 11.

15. The apparatus for determining the screen light intensity value according to claim 14, wherein the processor is further configured to determine the screen light intensity value of the terminal based on the determined light intensity calibration coefficient and the screen light intensity detection value by:

adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

16. A non-transitory computer-readable storage medium having instructions stored thereon for execution by a processor of a mobile terminal to enable the mobile terminal to execute the method for determining the screen light intensity value according to claim 11.

17. The non-transitory computer-readable storage medium according to claim 16, wherein the determining the screen light intensity value of the terminal based on the determined light intensity calibration coefficient and the screen light intensity detection value comprises:

adopting a product of the light intensity calibration coefficient and the screen light intensity detection value as a calibrated screen light intensity detection value; and adopting a product of the calibrated screen light intensity detection value and a spectral attenuation gain coefficient as the screen light intensity value of the terminal.

* * * * *